US007814822B2

(12) United States Patent
Brennan et al.

(10) Patent No.: US 7,814,822 B2
(45) Date of Patent: Oct. 19, 2010

(54) DEVICE AND METHOD FOR CONTROLLED BREACHING OF REINFORCED CONCRETE

(75) Inventors: Mike Brennan, Bristow, VA (US); Brett Goldstein, Potomac, MD (US); Luis Giraldo, Fairfax, VA (US); Rob Wallace, Woodbridge, VA (US); John Ryan, Fairfax, VA (US); Ed Dezelick, Germantown, MD (US); Mike Millspaugh, Burke, VA (US)

(73) Assignee: Raytheon UTD Inc.

( * ) Notice: Subject to any disclaimer, the term of this patent is extended or adjusted under 35 U.S.C. 154(b) by 25 days.

(21) Appl. No.: 12/000,879

(22) Filed: Dec. 18, 2007

(65) Prior Publication Data
US 2009/0151587 A1  Jun. 18, 2009

(51) Int. Cl.
*B25D 9/00* (2006.01)
(52) U.S. Cl. .................................................. 89/1.14
(58) Field of Classification Search .................. 89/1.14; 227/8, 9; 408/76; 29/254; 173/31, 38, 32, 173/36, 52; 248/678, 679, 52, 269, 200
See application file for complete search history.

(56) References Cited

U.S. PATENT DOCUMENTS

| | | | | |
|---|---|---|---|---|
| 1,585,740 A | * | 5/1926 | Saulia | 173/52 |
| 1,804,712 A | * | 5/1931 | Stevens | 173/162.1 |
| 1,932,106 A | * | 10/1933 | Hirschberg | 173/52 |
| 2,101,159 A | * | 12/1937 | Stevens | 173/169 |
| 2,675,546 A | * | 4/1954 | Catlin et al. | 227/11 |
| 2,945,236 A | * | 7/1960 | Marsh et al. | 227/8 |
| 3,016,539 A | * | 1/1962 | Marsh et al. | 227/10 |
| 3,038,159 A | * | 6/1962 | Helderman | 227/8 |
| 3,335,805 A | * | 8/1967 | Diez et al. | 173/121 |
| 3,559,272 A | * | 2/1971 | Hsu | 29/432 |
| 3,613,431 A | * | 10/1971 | Meyer | 72/369 |
| 3,622,060 A | * | 11/1971 | Gussalli | 227/8 |
| 3,677,457 A | * | 7/1972 | Ramspeck et al. | 227/8 |
| 4,067,400 A | * | 1/1978 | Nikolaev et al. | 173/206 |
| 4,068,790 A | * | 1/1978 | Osterle et al. | 227/8 |
| 4,074,843 A | * | 2/1978 | Oesterle | 227/8 |
| 4,493,376 A | * | 1/1985 | Kopf | 173/210 |
| 4,750,568 A | | 6/1988 | Roxton et al. | |
| 5,196,647 A | * | 3/1993 | Majors | 102/303 |
| 5,243,761 A | | 9/1993 | Sullivan et al. | |
| 5,251,532 A | * | 10/1993 | Frommelt et al. | 89/1.14 |
| 5,329,685 A | * | 7/1994 | Gillespie | 29/254 |

(Continued)

FOREIGN PATENT DOCUMENTS

EP    1 231 610 A2    8/2002

(Continued)

*Primary Examiner*—Michael Carone
*Assistant Examiner*—Reginald Tillman, Jr.
(74) *Attorney, Agent, or Firm*—Dickstein Shapiro LLP (57) ABSTRACT

A breaching apparatus includes an impactor element and a self-contained energy source. The self-contained energy source enables the impactor element to impact a first surface of a structure. The impactor element is configured to transmit a localized shock wave through the structure upon impact. The self-contained energy source is capable of accelerating the impactor element to a velocity sufficient to induce spalling at a second surface of the structure. Multiple breaching apparatuses can be supported by a frame to facilitate simultaneous or successive breaching of the structure. The breaching apparatus can be used in a method to breach a concrete structure.

12 Claims, 9 Drawing Sheets

U.S. PATENT DOCUMENTS

| | | | |
|---|---|---|---|
| 5,465,893 A | 11/1995 | Thompson | |
| 5,987,723 A * | 11/1999 | McNally et al. | 29/254 |
| 6,257,673 B1 * | 7/2001 | Markham et al. | 299/100 |
| 6,318,228 B1 * | 11/2001 | Thompson | 89/1.14 |
| 6,413,022 B1 * | 7/2002 | Sarh | 408/76 |
| 6,431,426 B1 * | 8/2002 | Ehmig | 227/10 |
| 6,631,668 B1 * | 10/2003 | Wilson et al. | 89/1.14 |
| 6,857,548 B1 * | 2/2005 | Clark | 227/130 |
| 6,889,591 B2 * | 5/2005 | Sabates et al. | 89/1.14 |
| 2002/0112599 A1 * | 8/2002 | Sabates et al. | 89/1.14 |
| 2003/0015088 A1 * | 1/2003 | Wursch et al. | 89/1.14 |
| 2003/0173098 A1 * | 9/2003 | Miner et al. | 173/200 |
| 2004/0118577 A1 * | 6/2004 | Morissette | 173/38 |
| 2004/0200342 A1 * | 10/2004 | Sansolo | 89/1.14 |
| 2005/0284649 A1 | 12/2005 | Sabates et al. | |
| 2007/0086868 A1 | 4/2007 | Ray | |

FOREIGN PATENT DOCUMENTS

| | | |
|---|---|---|
| GB | 910754 | 11/1962 |
| WO | WO 95/07167 | 3/1995 |

* cited by examiner

FIG.1

MOIL POINT

3/4" BLUNT

HILTI® SELF SHARPENING POINT 1-1/8" BLUNT (MUSHROOM)

3" BLUNT IMPACTOR

FLAT BLADE (1" AND 3" WIDE)

DEVICE AND METHOD FOR CONTROLLED BREACHING OF REINFORCED CONCRETE

STATEMENT REGARDING FEDERALLY-SPONSORED RESEARCH AND DEVELOPMENT

Part of the work performed during development of this invention utilized U.S. Government funds. The U.S. Government has certain rights in this invention.

TECHNICAL FIELD

Embodiments described herein relate generally to tools and methods for breaching concrete.

BACKGROUND

Urban search and rescue teams often need to create openings (called "breaching") in rigid structures, such as reinforced concrete walls, to reach victims in buildings after a disaster, such as an earthquake or a hurricane. To facilitate the search and rescue effort, breaching equipment is preferably portable, easy to operate, and rapid in effect while not destabilizing the building structure or threatening injury to operators or victims.

Conventional techniques for breaching concrete walls include gasoline and hydraulic powered diamond chain saws, gasoline and hydraulic powered circulars saws, diamond wire saws, large bore corers, hydraulic/pneumatic/electric impact tools, water jets, and hydraulic splitters. These techniques all can typically require several hours to breach a thick, heavily reinforced concrete wall, and the equipment may not be portable in some instances. Military teams also use explosives to quickly breach walls, but this is dangerous to victims and can destabilize the structure. Lasers have also been proposed for breaching applications, but size, safety, and power constraints generally make them infeasible.

Accordingly, devices and methods are needed that address one or more of the aforementioned shortcomings of conventional reinforced concrete breaching devices and methods.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention.

In the drawings, like reference numbers indicate like elements. Additionally, the leftmost digit(s) of a reference number identifies the drawing in which the reference number first appears.

DETAILED DESCRIPTION

The embodiments described herein are particularly applicable to concrete and masonry based on the inherently weak tension and shear properties of these materials. Accordingly, the embodiments described herein refer specifically, and by way of example, to techniques for breaching reinforced concrete. However, it will be readily apparent to persons skilled in the relevant art(s) that the embodiments are equally applicable to techniques for breaching other structures. Changes can be made to the embodiments disclosed herein without departing from the scope of the invention, which is defined only by the scope of the appended claims.

The embodiment(s) described, and references in the specification to "one embodiment", "an embodiment", "an example embodiment", etc., indicate that the embodiment(s) described can include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
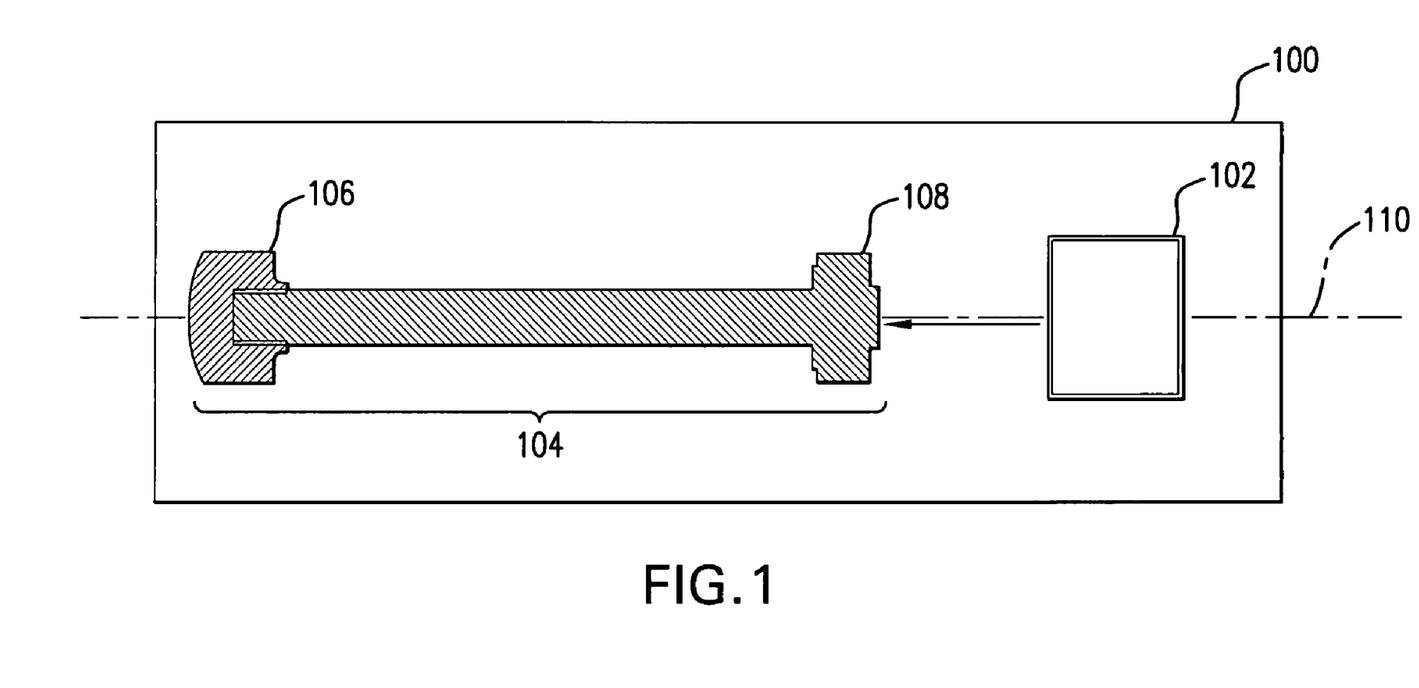
FIG. 1 illustrates an example of a breaching apparatus in accordance with an embodiment disclosed herein.

FIG. 1 illustrates an example implementation of a breaching apparatus 100 in accordance with an embodiment disclosed herein. Breaching apparatus 100 includes a self-contained energy source 102 and an impactor element 104. An energy source 102, which is preferably self-contained, provides energy to propel impactor element 104 upon a first surface 402 of a structure 400 (FIG. 4), thereby causing localized structural failure (i.e., spalling) at a second surface 404 of the structure 400. The first and second surfaces 402, 404 of the structure 400 are not the same. For example, the first and second surfaces 402, 404 of the structure 400 can be opposing surfaces. In the case of a reinforced concrete or cement wall, such as used in the support structure of a building, the impactor element 104 can be caused to impact an exterior surface of the concrete wall and the spalling occurs on the interior surface opposite the impact site.

Figure 4:
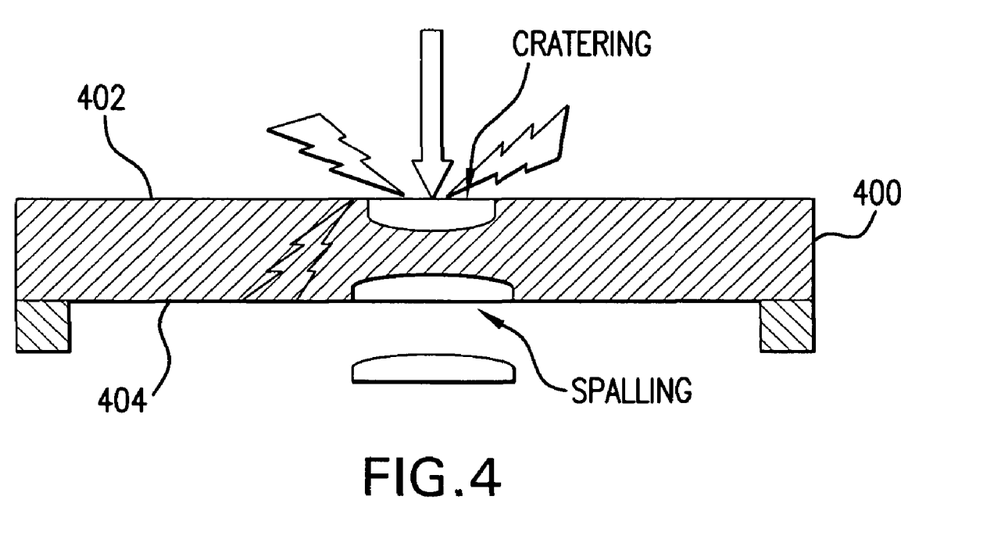
FIG. 4 illustrates a breaching technique in accordance with an embodiment disclosed herein.

The self-contained energy source 102 is said to be "self-contained" because the energy source 102 is not dependent upon external energy sources that are typically connected by hoses or wires, to provide the energy necessary to propel the impact element 104. Actuation of a self-contained energy source 102 causes the impactor element 104 to accelerate along an axis 110. The impactor element 104 impacts the first surface 402 of the structure 400, causing a localized shock wave to travel through the structure 400. The shock wave induces spalling at the second surface 404 of the structure 400. Accordingly, self-contained energy source 102 is capable of accelerating impactor element 104 to a velocity sufficient to induce spalling at the second surface 404.

The shock wave can create shear failure of a structural element embedded in the structure 400, though the scope of the embodiments are not limited in this respect. For instance, transmitting the shock wave through reinforced concrete can cause shear failure of the rebar in the concrete. Moreover, some of the imparted shock energy can transmit along the rebar, causing separation of the surrounding concrete from the rebar surface, further weakening the structure 400 near the point of impact.

The self-contained energy source 102 can utilize any suitable type of energy to accelerate the impactor element 104. For example, the energy source 102 can utilize powder actuated cartridges, similar to firearm or artillery shells, compressed air, combustible gas, etc., or any combination thereof.

Figure 2:
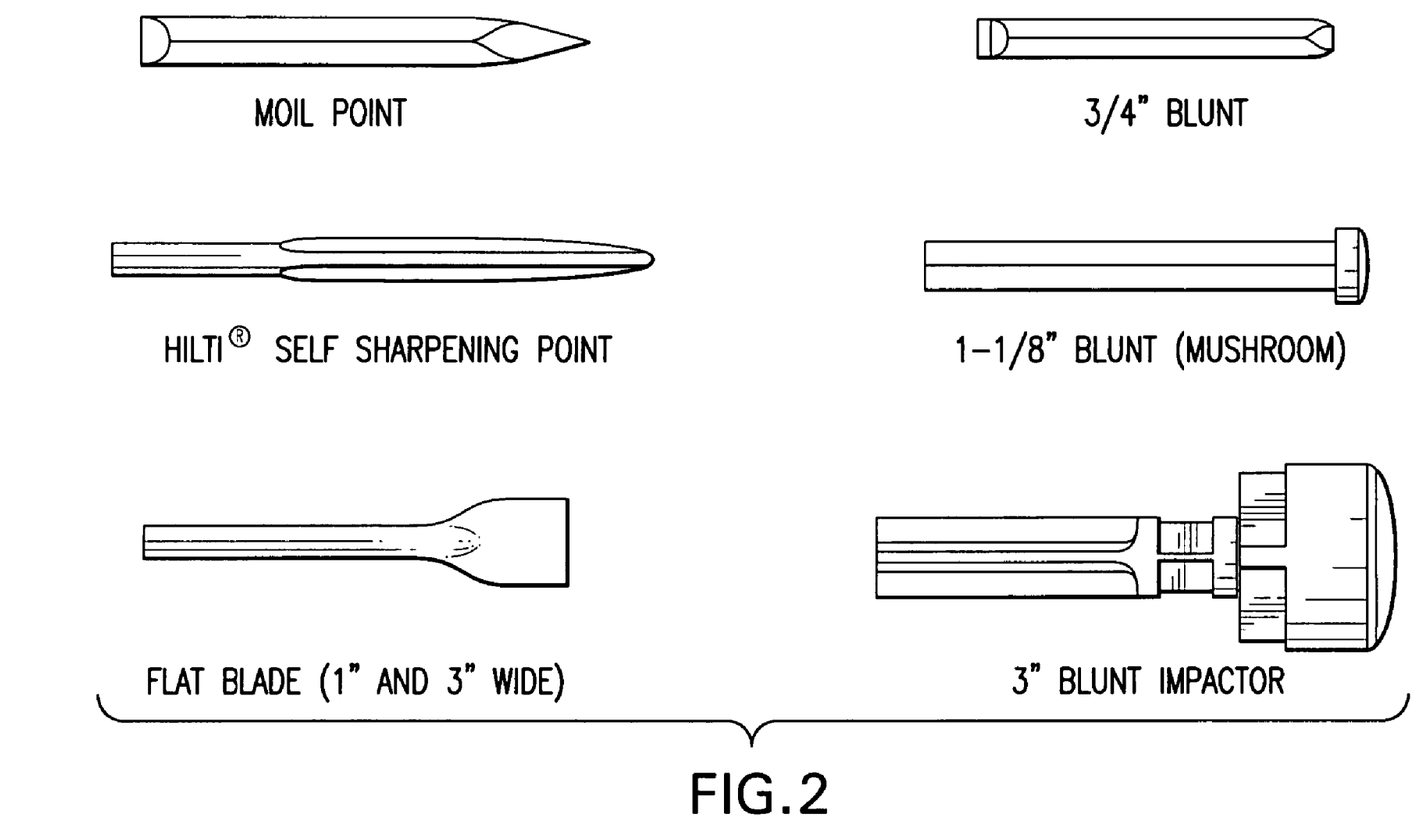
FIG. 2 shows examples of impactor heads in accordance with embodiments disclosed herein.

In FIG. 1, the impactor element 104 includes a piston 108 and an impactor head 106 for illustrative purposes, although persons skilled in the art will recognize that impactor element 104 can be a unitary member. The piston 108 can be configured to support a variety of different impactor heads. For instance, different types of heads can be better suited for different types of applications and/or structures. FIG. 2 shows some example types of impactor heads. Referring to FIG. 2, impactor head 106 can be a Moil point, a Hilti® self-sharpening point, a flat blade, a blunt, a mushroom blunt, or a blunt impactor, to provide some non-limiting examples.

Figure 3:
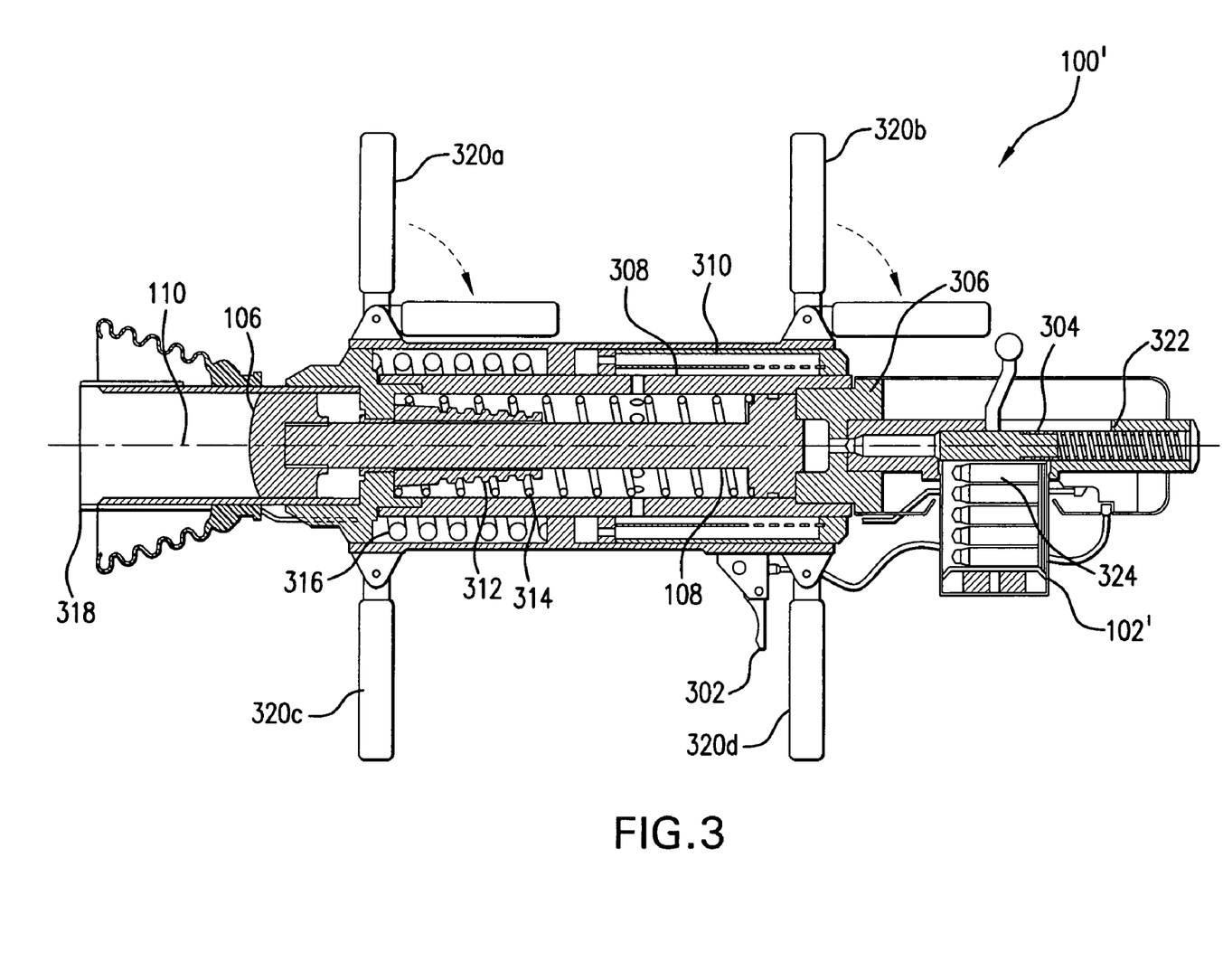
FIG. 3 illustrates an example of a breaching apparatus in accordance with an embodiment disclosed herein.

FIG. 3 illustrates a breaching apparatus 100' having a variety of optional features in accordance with an embodiment disclosed herein. In FIG. 3, the breaching apparatus 100' includes a chamber 308 to guide a piston 108 along an axis 110 when a self-contained energy source 102' is actuated. For example, a user can pull a trigger 302 to actuate the self-contained energy source 102'. When the trigger 302 is pulled, a firing element 322 ignites powder in a loaded powder actuated cartridge 324. The expanding combustion gases from the cartridge 324 increase the pressure in the chamber 308. The piston 108 is accelerated along axis 110 in a direction away from a breech 304, thereby compressing a return spring 314. The movement of the piston 108 along the axis 110 can cause a bumper 312 to be compressed, depending upon the force the piston 108 exerts on the return spring 314. For instance, the return spring 314 may not compress enough for bumper 312 to become compressed. The return spring 314 ensures that the piston 108 is returned to its pre-actuation position, so that the piston 108 can be accelerated again using another powder actuated cartridge 324, possibly the next in succession in a magazine. The bumper 312 works to stop the piston to protect the structural integrity of the apparatus 100' in the event that the tool is applied to and actuated with a weakened or compromised structure 400.

A firing element 322 is shown in FIG. 3 to be spring-loaded, although persons skilled in the relevant art will recognize that other types of firing elements can be used. For instance, firing element 322 can be a solenoid-driven firing element, if desired.

An energy source 102' is shown to include a plurality of powder actuated cartridges 324 for illustrative purposes, although other types of energy can be utilized. A bolt action breech 304 is shown for loading a single powder actuated cartridge 324 at a time. For example, the powder actuated cartridges 324 can be held in a magazine that advances the remaining charges each time the bolt action breech 304 removes a cartridge 324 from the magazine. Persons skilled in the relevant art(s) will recognize that other types of breeches can be used, including but not limited to a breech configured to facilitate semi-automatic loading of successive cartridges 324 of the plurality of powder actuated cartridges 324. Breech fitting 306 connects breech 304 to chamber 308.

Handles 320a-320d, as shown in FIG. 3, can be provided for the breaching apparatus 100', which according to one embodiment is hand-operated by one or more users. Handles 320a-b are shown to be retractable for illustrative purposes. A muffler assembly 310 can be incorporated to reduce the noise emitted from breaching apparatus 100' upon actuation of a cartridge 324. A recoil mitigation element 316 can be provided to reduce the recoil imposed by breaching apparatus 100' upon actuation of the cartridge 324. For example, the recoil mitigation element 316 can include any of a variety of springs, dampers, and/or elastomer materials to limit the force against users of breaching apparatus 100'.

The breaching apparatus 100' can include any of a variety of safety features, such as any safety features available for hand guns and/or rifles as well as construction equipment. For example, trigger 302 can have a safety locking feature, such as a thumb activated trigger locking device (not shown). A debris shield (not shown) can be included to protect users and/or the breaching apparatus 100' from debris and/or exhaust gases. An interlock element 318 is a safety feature that hinders actuation of the energy source 102' in response to the breaching apparatus 100' not being in contact with a structure 400. For example, the interlock element 318 can be pressure-activated to determine whether the interlock element 318 is in contact with a surface. In another example, the interlock element 318 can emit a signal that is reflected off the surface 400. In this example, the interlock element 318 is configured to determine a time between emission of the signal and detection of the reflected signal to determine a distance between the interlock element 318 and the surface 400. If the interlock element 318 is not within a predetermined proximity to (or in contact with) the surface 400, pulling the trigger 302 fails to actuate the energy source 102'.

Although the self-contained energy source 102' in FIG. 3 is shown to utilize powder actuated cartridges 324, persons skilled in the relevant art(s) will recognize that any suitable type of energy can be utilized. For example, the energy source 102' can include compressed air and/or gas that is charged to a predetermined pressure corresponding with a desired force of impact. In this example, a fast-acting valve allows the compressed air and/or gas to act against the piston 108, driving the impactor head 106 against a surface of a structure 400. Using compressed air and/or gas in lieu of a powder actuated charge can require the breaching apparatus 100' to be longer along the axis 110 to achieve the same impact force, because more distance can be needed to achieve the same velocity that is accomplished using the powder actuated charge. On the other hand, self-contained energy source 102' can supply compressed air and/or gas using currently available high pressure air breathing bottles, such as SCUBA or SCBA type bottles or the 3000 psi or 4500 psi breathing air tanks that search and rescue team members currently use. Compressed air operation does not produce noxious gases (combustion by-products) as the powder cartridges do. Elimination of the noxious gases provides a safer environment for rescue personnel and victims during confined space breaching operations.

The self-contained energy source 102' can include a combustible gas (e.g., a butane/air mixture), which can be ignited to expand the combustion gases, thereby propelling the impactor element 104 to the necessary velocity to induce spalling. Such combustible gas techniques can be similar to those utilized by conventional nail guns used in construction.

The breaching apparatus 100' can be portable, though the scope of the embodiments are not limited in this respect. Breaching apparatus 100' can be configured to transmit a shock wave through rock and/or soil. For example, the breaching apparatus 100' can be used to conduct seismographic or geological studies. In this example, the impactor head 106 can have a shape to facilitate such studies.

FIG. 4 shows a structure 400 affected by a breaching technique in accordance with an embodiment disclosed herein. FIG. 4 illustrates that impacting a first surface 402 of structure 400 with an impactor head 106 can cause cratering at the first surface 402 and does cause spalling at a second surface 404. In FIG. 4, the second surface 404 is shown to oppose the first surface 402, though the scope of the embodiments described herein are not limited in this respect.

Figure 5:
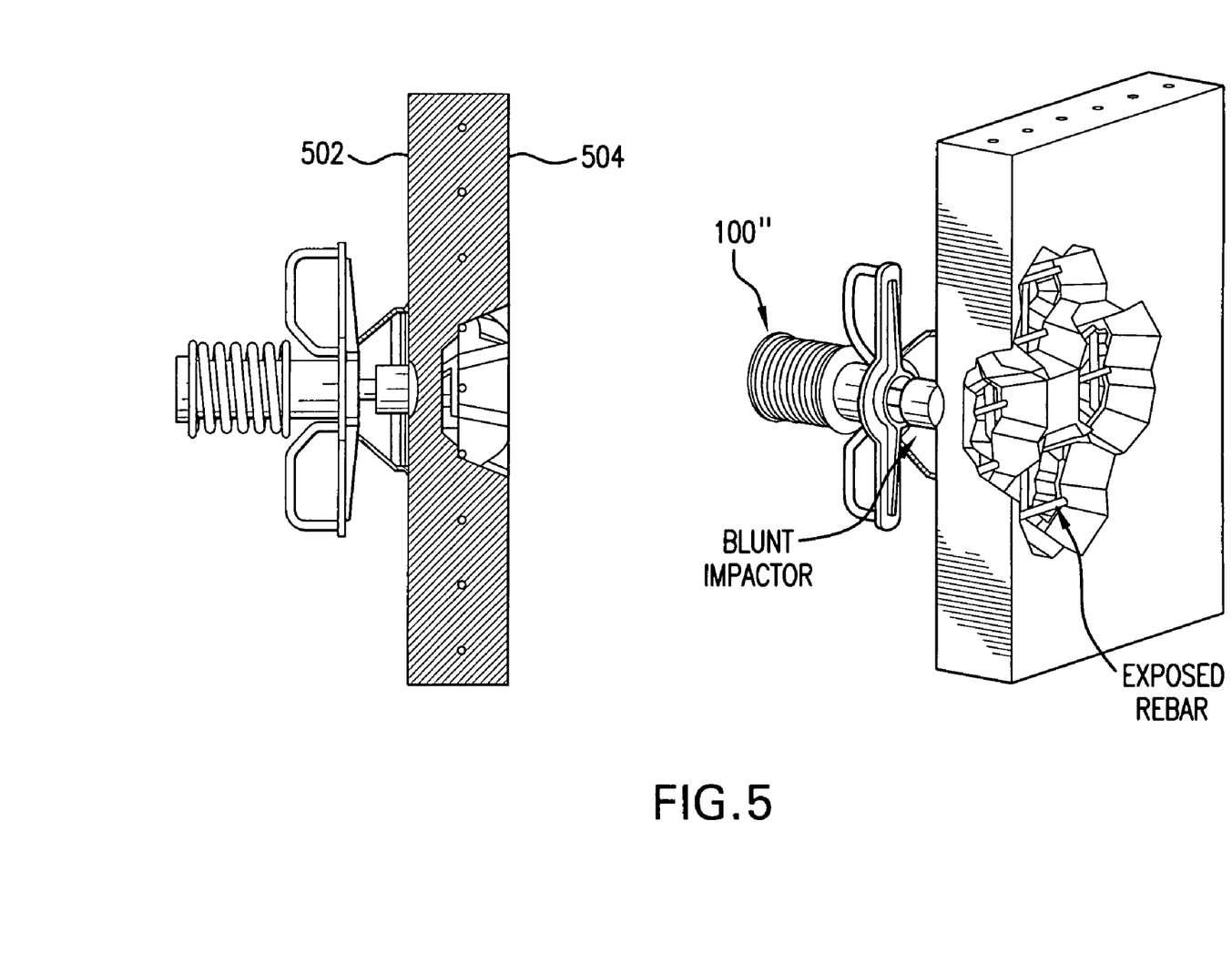
FIG. 5 illustrates a breaching technique in accordance with an embodiment disclosed herein.

FIG. 5 illustrates spalling damage caused by a breaching technique in accordance with an embodiment disclosed herein. In FIG. 5, breaching apparatus 100" uses a blunt impactor head 106 to breach a reinforced concrete wall. When the blunt impactor head 106 impacts a first surface 502 of the wall, spalling at the second surface 504 causes the rebar within the wall to become exposed and separated from the concrete.

Figure 6A:
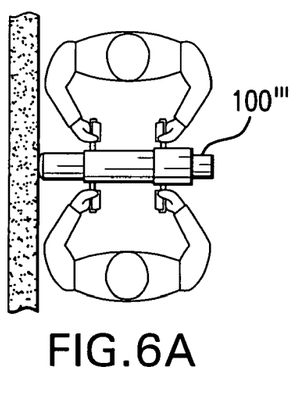
FIGS. 6A-6F show exemplary mounting techniques in accordance with embodiments disclosed herein.

FIGS. 6A-6F show respective mounting techniques in accordance with embodiments disclosed herein. FIG. 6A illustrates that breaching apparatus 100''' can be hand-held against the surface 402 to be impacted by one or more persons. In FIG. 6A, two people are shown supporting the full weight of breaching apparatus 100''' for illustrative purposes. Any number of people (1, 2, 3, or more) can hold the breaching apparatus 100'''. The person(s) holding breaching apparatus 100''' need not necessarily hold the full weight of breaching apparatus 100'''. For example, the person(s) can support a portion of the weight, while some other device (e.g., a mounting element, support, webbing strap, anchor, etc.) supports the remainder of the weight.

Figure 6B:
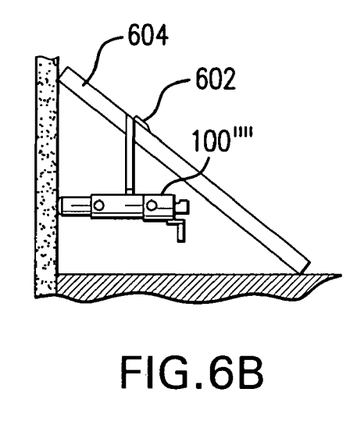

FIG. 6B illustrates that a webbing strap 602 can be used to suspend the breaching apparatus 100'''' from a support 604. Any number of webbing straps can be used. In FIG. 6B, a webbing strap 602 is shown to support the full weight of the breaching apparatus 100'''' for illustrative purposes, though the scope of the embodiments described herein are not limited in this respect. For instance, the webbing strap 602 can be made of flexible material that enables at least a portion of the weight of the breaching apparatus 100'''' to be supported by another means.

Figure 6C:
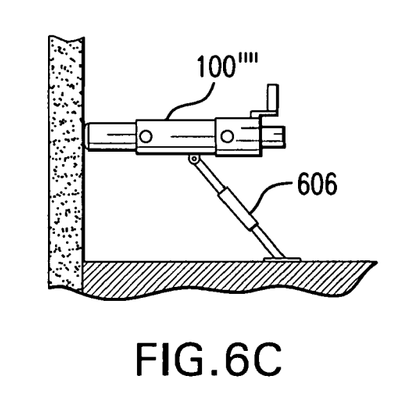

In FIG. 6C, a support element 606 supports breaching apparatus 100'''' against the surface 402 to be impacted. Support element 606 can be extendable and/or collapsible. Support element 606 can include a shock module to absorb at a portion of the recoil force resulting from actuating the energy source of breaching apparatus 100''''. Any number of supports can be used to support the breaching apparatus 100''''.

Figure 6D:
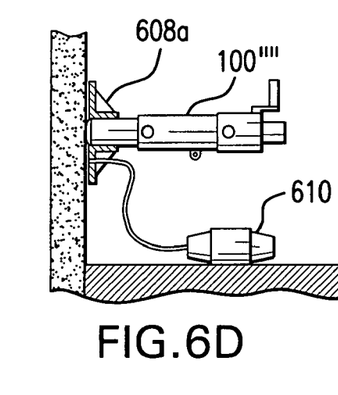
Figure 6E:
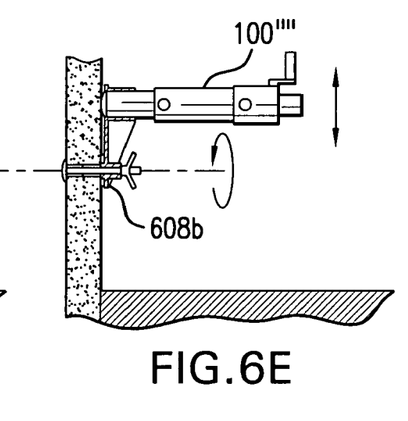
Figure 6F:
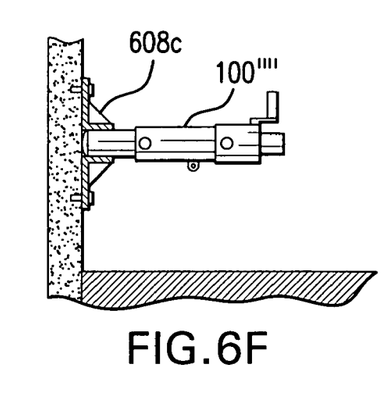

FIGS. 6D-F illustrate that the breaching apparatus 100'''' can be mounted to the surface 400 to be impacted using a respective mounting element 608a, b, or c. In FIG. 6D, mounting element 608a is shown to be a vacuum element, which is attached to a vacuum source 610 to enable mounting element 602a to remain mounted to the surface. In FIG. 6E, mounting element 608b is configured to enable breaching apparatus 100'''' to be rotated about a fixed point on the surface to be impacted. For example, the impactor element 104 of breaching apparatus 100'''' can be accelerated against the surface 402 at multiple points along the circumference of the circle defined by mounting apparatus 608b. In FIG. 6F, mounting element 608c includes anchor bolts to mount breaching apparatus 100'''' to the surface 402 to be impacted. In FIGS. 6D-F, mounting elements 608a-c are also considered support elements, because mounting elements 608a-c support the breaching apparatus 100'''' against the surface 402 to be impacted.

Figure 7:
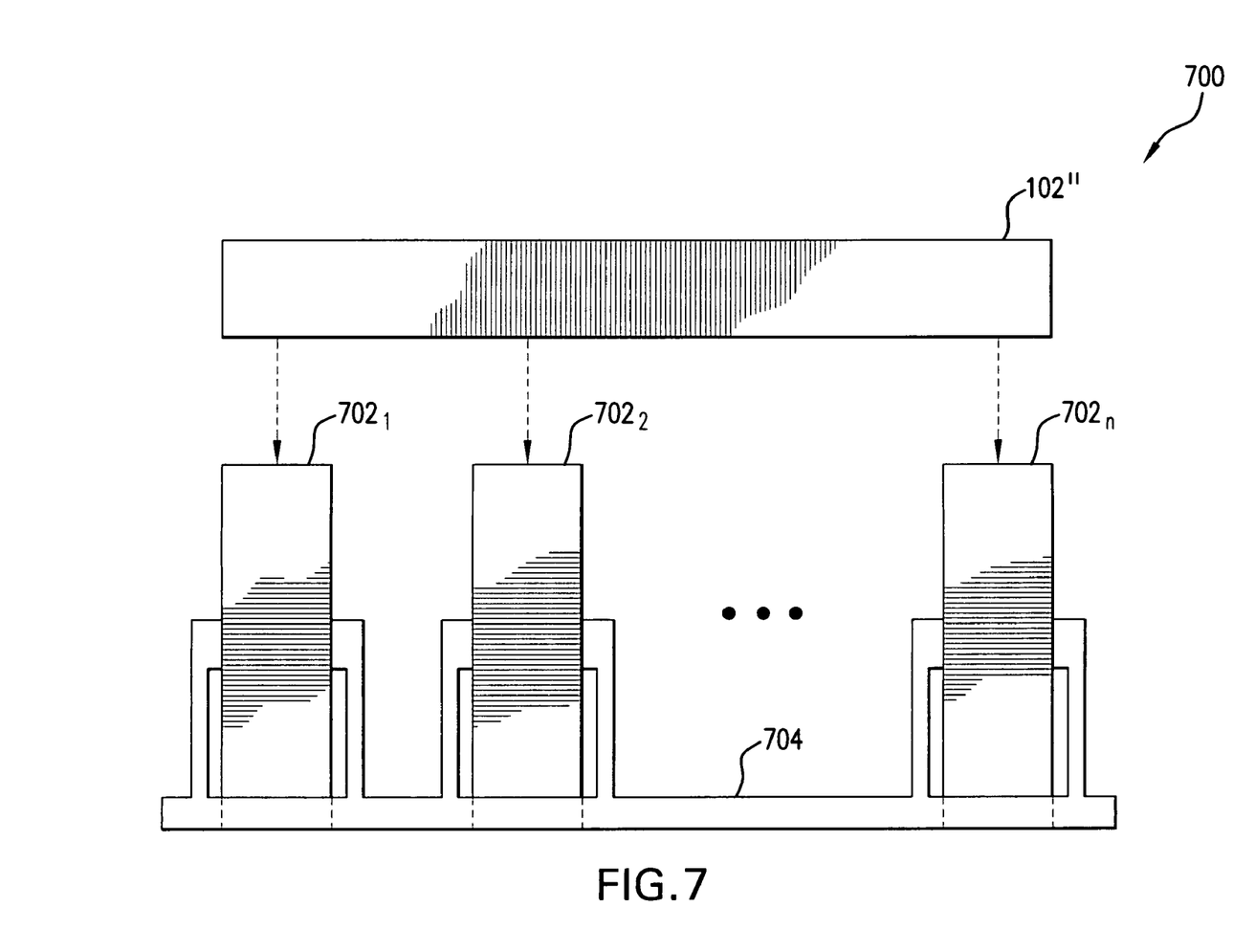
FIG. 7 illustrates a breaching system in accordance with an embodiment disclosed herein.

FIG. 7 illustrates an example of a breaching system 700 in accordance with an embodiment disclosed herein. The breaching system 700 includes a self-contained energy source 102", a plurality of breaching apparatuses $702_1$-$702_n$, and a frame 704. Each of the breaching apparatus $702_1$-$702_n$ includes an impactor element, such as impactor element 104 shown in FIG. 1. Each impactor element 104 is configured to transmit a localized shock wave through a structure upon impact with a first surface 402 thereof. Frame 704 structurally supports the plurality of breaching apparatuses $702_1$-$702_n$. Self-contained energy source 102" is capable of accelerating each of the impactor elements 104 to a velocity sufficient to induce spalling at a second surface 404 of the structure upon impact with the first surface 402. For example, self-contained energy source 102" can include a plurality of energy sources corresponding to respective breaching apparatus of the plurality of breaching apparatuses $702_1$-$702_n$. In another example, breaching apparatuses $702_1$-$702_n$ include the respective energy sources. In yet another example, self-contained energy source 102" includes a single energy source that is circulated among the plurality of breaching apparatuses $702_1$-$702_n$.

The breaching system 700 can include an actuation element configured to actuate self-contained energy source 102" to simultaneously accelerate the respective impactor elements of breaching apparatuses $702_1$-$702_n$. On the other hand, the actuation element can be configured to actuate self-contained energy source 102" independently for each of the breaching apparatuses $702_1$-$702_n$ to accelerate the respective impactor elements 104 successively. For instance, actuating breaching apparatuses $702_1$-$702_n$ sequentially can reduce destabilization of the structure, as compared to actuating breaching apparatuses $702_1$-$702_n$ simultaneously.

Figure 8:
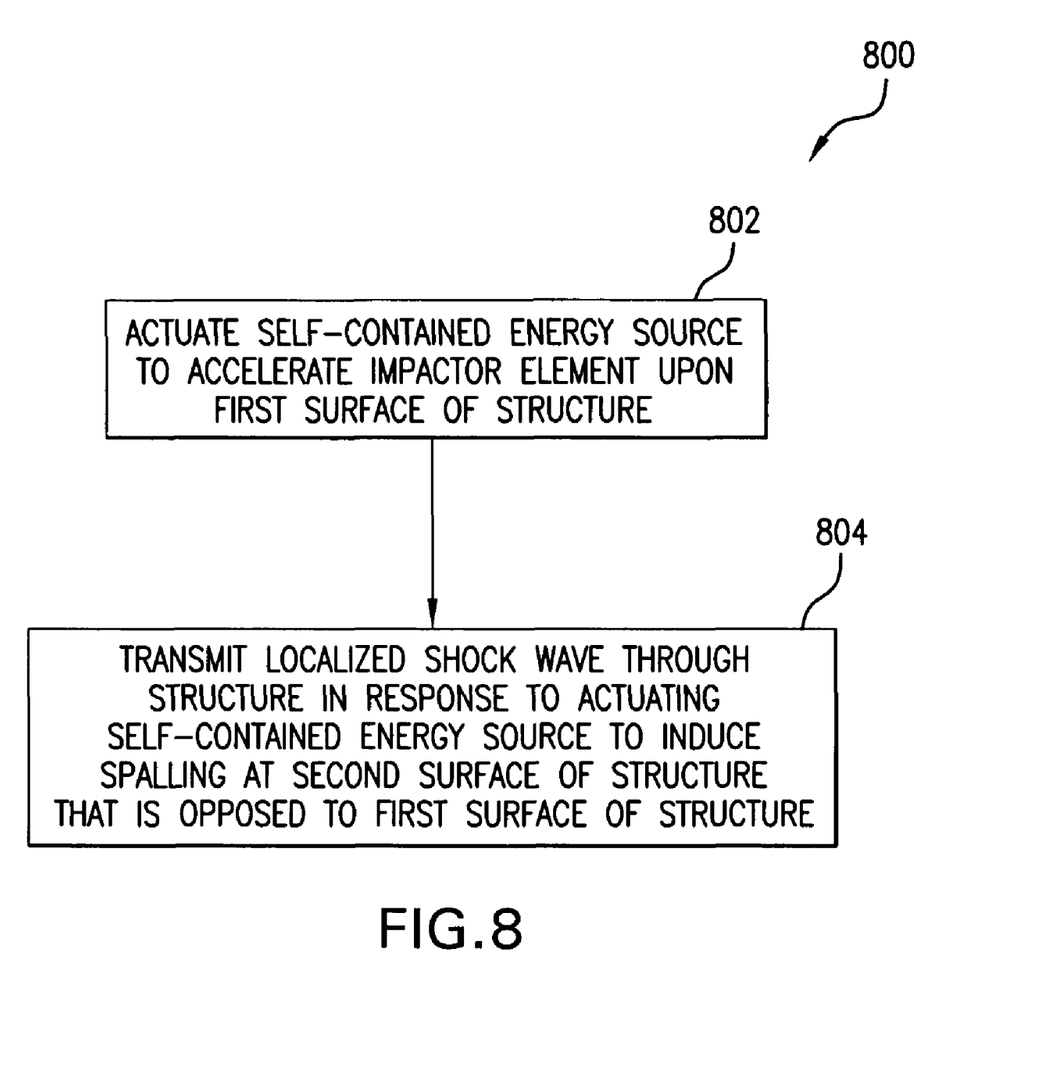
FIGS. 8 and 9 illustrate methods in accordance with embodiments disclosed herein.
Figure 9:
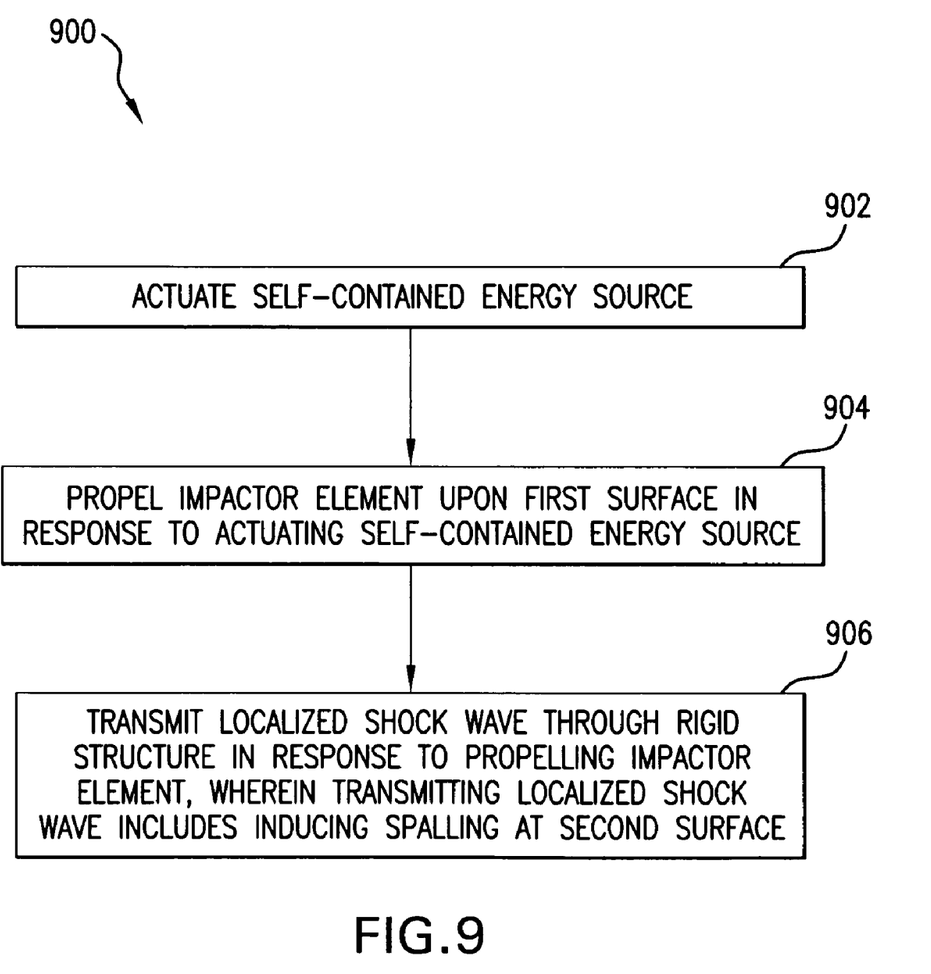

FIGS. 8 and 9 are flowcharts of methods in accordance with embodiments disclosed herein. The embodiments described herein, however, are not limited to the description provided by the flowcharts 800, 900. Rather, it will be apparent to persons skilled in the relevant art(s) from the teachings provided herein that additional steps or sequence of steps are within the scope and spirit of the embodiments.

Flowcharts 800, 900 will be described with continued reference to breaching system 100, 100' and components thereof described above in reference to FIGS. 1 and 3, though the method is not limited to those embodiments.

Referring now to FIG. 8, a self-contained energy source is actuated to accelerate an impactor element upon a first surface of a structure at step 802. For example, firing element 322 can actuate self-contained energy source 102 to accelerate impactor element 104 upon the first surface. At step 804, a localized shock wave is transmitted through the structure in response to actuating the self-contained energy source to induce spalling at a second surface of the structure that is opposed to the first surface of the structure. For instance, impactor element 104 can transmit the localized shock wave.

In FIG. 9, a self-contained energy source is actuated at step 902. For example, firing element 322 can actuate self-contained energy source 102. At step 904, an impactor element is propelled upon a first surface of a rigid structure in response to actuating the self-contained energy source. For example, energy source 102 can propel impactor element 104 upon the first surface of the rigid structure. At step 906, a localized shock wave is transmitted through the rigid structure in response to propelling the impactor element. Transmitting the localized shock wave includes inducing spalling at a second surface of the structure that opposes the first surface. For instance, impactor element 104 can transmit the localized shock wave.

The embodiments described herein have a variety of applications. For example, the embodiments can provide rapid breaching of reinforced concrete in damaged or collapsed structures to allow urban search and rescue teams to reach trapped victims; rapid breaching by law enforcement personnel of secured doors and entryways; and/or rapid insertion of stakes or anchors into concrete or other tough materials. The embodiments can facilitate concrete demolition and/or impart shock waves in rock or soil for seismographic and geological studies.

Utilization of a self-contained energy source, as described herein, provides a variety of benefits, as compared to conventional breaching techniques. For example, the self-contained energy source eliminates the need for external energy sources that are typically connected by hoses or wires, to provide the energy necessary to breach a structure. Persons skilled in the relevant art(s) will recognize that the embodiments described herein can nevertheless be compatible with such equipment.

Powder actuated cartridges can supply a substantial amount of controlled energy in a relatively short time period. For instance, a .27 caliber cartridge used in commercial powder actuated nailers contains 460 Joules (J) of energy, and a .458 Winchester cartridge contains 6400 J. Aircraft missile ejectors use even larger cartridges. In comparison, a typical commercially available hydraulic breaker can deliver a maximum of 65 J per blow, with many blows per second. However, this hydraulically actuated tool requires a 300 lb external hydraulic power unit, and an umbilical of hydraulic hoses. The power source can be tailored to the specific use of the device.

The powder actuated cartridge embodiments described herein are capable of combining the speed and efficiency of an impact type tool with the relatively small size and greater energy of powder actuated cartridges. This can allow a breaching apparatus to be human-portable and/or deliver more energy to a structure than conventional methods, resulting in faster breaching times. As compared to shape charges and other explosives, a cartridge based breaching apparatus is safer and easier to use, for example, because the controlled propellant burn is contained inside the breaching apparatus, and the energy can be applied incrementally to adapt to a given situation.

The powder actuated cartridges utilized by a breaching apparatus can be similar to those used by commercial concrete nail guns, for example, though the cartridges can be larger.

Example embodiments of methods, systems, and components thereof have been described herein. As noted elsewhere, these example embodiments have been described for illustrative purposes only, and are not limiting. Other embodiments and modifications, though presently unforeseeable, of the embodiments described herein are possible and are covered by the invention. Such other embodiments and modifications will be apparent to persons skilled in the relevant art(s) based on the teachings contained herein. Thus, the breadth and scope of the present invention should not be limited by any of the above described exemplary embodiments, but should be defined only in accordance with the following claims and their equivalents.

What is claimed as new and desired to be protected by Letters Patent of the United States is:

1. A method of breaching a concrete wall structure, said method comprising the steps of:
   providing an apparatus that includes a self-contained energy source and an impactor element, said impactor element including a blunt impactor face;
   actuating said self-contained energy source to accelerate said blunt impactor face of said impactor element toward a first surface of said concrete structure, and to cause said blunt impactor face to impact upon said first surface of said concrete structure; and
   transmitting a localized shock wave through the concrete structure and inducing spalling at a second surface of said concrete structure that is opposed to the first surface of the concrete structure, and thereby structurally weaken a prescribed area and create an opening through said concrete structure.

2. The method of claim 1, wherein the energy source includes powder actuated cartridges, and wherein said method of breaching includes the steps of actuating a first one of said cartridges, and then actuating a second one of said cartridges.

3. The method of claim 1, wherein said step of actuating said energy source occurs while said apparatus is held by at least one human operator in a stationary position.

4. The method of claim 3, wherein said step of actuating said energy source includes the step of operating a trigger, and wherein said step of operating said trigger is performed while said apparatus is held by said human operator in said stationary position, and wherein said step of operating said trigger is performed by said human operator.

5. The method of claim 4, further comprising the step of actuating a powder actuated cartridge, and wherein said step of actuating said powder actuated cartridge occurs subsequent to said step of transmitting said localized shock wave through said concrete structure and inducing spalling at said second surface.

6. The method of claim 2, wherein said step of accelerating said blunt impactor face toward said first surface of said concrete wall includes the step of moving said blunt impactor face from a first position, where the blunt impactor face is spaced apart from the first surface, to a second position, where the blunt impactor face contacts the first surface, and wherein the step of actuating said first one of said powder cartridges occurs while said blunt impactor face is in said first position, and wherein said step of transmitting said localized shock wave occurs while said blunt impactor face is in said second position.

7. The method of claim 6, wherein said step of actuating the first cartridge includes activating a spring-loaded firing element.

8. The method of claim 6, wherein actuating the first cartridge includes activating a solenoid-driven firing element.

9. A method of breaching a concrete wall of a rigid concrete structure, said concrete wall of said structure having first and second opposing surfaces, comprising:
   actuating a self-contained energy source;
   propelling a blunt impactor face of an impactor element upon the first surface of said concrete wall in response to actuating the self-contained energy source; and
   transmitting a localized shock wave through said concrete wall of the rigid concrete structure in response to propelling the blunt impactor face of the impactor element, wherein transmitting the localized shock wave causes spalling at the second surface of said concrete wall of said rigid concrete structure, to thereby structurally weaken a prescribed area and create an opening through said concrete wall.

10. The method of claim 9, wherein a structural element is embedded in the rigid structure.

11. The method of claim 9, wherein said rigid structure includes reinforced concrete, and wherein said reinforced concrete includes rebar and surrounding concrete, and wherein said method further includes the step of using said localized shock wave to separate the surrounding concrete from a surface of the rebar.

12. The method of claim 10, wherein said rigid structure includes reinforced concrete, and wherein said structural element includes rebar embedded in said reinforced concrete.

* * * * *